United States Patent
Hudson

(10) Patent No.: US 9,926,466 B2
(45) Date of Patent: Mar. 27, 2018

(54) AMIC ACIDS AS SURFACE TREATMENTS

(71) Applicant: Alice Hudson, Jupiter, FL (US)

(72) Inventor: Alice Hudson, Jupiter, FL (US)

( * ) Notice: Subject to any disclaimer, the term of this patent is extended or adjusted under 35 U.S.C. 154(b) by 0 days.

(21) Appl. No.: 14/974,187

(22) Filed: Dec. 18, 2015

(65) Prior Publication Data

US 2017/0174936 A1    Jun. 22, 2017

(51) Int. Cl.
    C09D 5/08       (2006.01)
    C04B 24/08      (2006.01)
    C07C 231/02     (2006.01)
    C07C 233/35     (2006.01)
    C09D 179/08     (2006.01)
    C09D 4/00       (2006.01)
    C09D 5/16       (2006.01)

(52) U.S. Cl.
CPC .............. *C09D 179/08* (2013.01); *C09D 4/00* (2013.01); *C09D 5/08* (2013.01); *C09D 5/1662* (2013.01)

(58) Field of Classification Search
None
See application file for complete search history.

(56) References Cited

U.S. PATENT DOCUMENTS

| | | | | |
|---|---|---|---|---|
| 3,444,151 A | * | 5/1969 | Gonzalez | C08F 257/02 526/203 |
| 3,729,529 A | * | 4/1973 | Andress, Jr. | C08F 8/00 260/DIG. 17 |
| 6,232,405 B1 | * | 5/2001 | Schmidhauser | C08F 8/32 523/160 |
| 7,365,108 B2 | * | 4/2008 | McGorrin | C09D 11/326 523/160 |
| 2009/0065736 A1 | * | 3/2009 | Johnson | C11C 3/00 252/88.1 |

FOREIGN PATENT DOCUMENTS

WO    WO 2014200671 A2 *   12/2014       C09K 8/06

* cited by examiner

*Primary Examiner* — Vu A Nguyen

(57) ABSTRACT

Surfaces are modified with polymeric or monomeric amic acids that also comprise one or more tertiary amine functional groups. The amic acids may provide benefits including hydrophilicity, soil resistance, and corrosion inhibition to the treated surfaces. Compositions and methods for treating surfaces are provided.

3 Claims, No Drawings

AMIC ACIDS AS SURFACE TREATMENTS

CROSS-REFERENCE TO RELATED APPLICATIONS

The present application claims the benefit of earlier U.S. Provisional Application 62/124,401, filed Dec. 18, 2014, which is incorporated herein by reference in its entirety.

FIELD OF THE INVENTION

This invention is to methods and compositions to modify surfaces to provide benefits including but not limited to hydrophilicity, soil resistance, and corrosion inhibition, and to the surfaces thus modified.

BACKGROUND OF THE INVENTION

The present invention relates to methods and compositions for the use of compounds commonly known as amic acids to modify surfaces to provide benefits that may include hydrophilicity, soil resistance, and corrosion inhibition. Amic acids are commonly defined as compounds comprising one or more amide moieties and one or more carboxylic acid or carboxylate moieties.

In the context of this invention "soil resistance" is defined as imparting improved soil release properties to surfaces to facilitate subsequent cleaning. It applies to hard surfaces, particularly hard surfaces in domestic and industrial or institutional cleaning. It is common experience that oily or greasy soils and/or limescale soils, including soils made substantially completely of mineral deposits, such as alkali metal, particularly calcium and/or magnesium carbonates; and stains which include such mineral deposits combined with other soil such as water insoluble soap salts, for example, calcium and/or magnesium stearates, and with greasy or oily soils, can be difficult to remove from hard surfaces. In comparison, hydrophilic soils are usually easier to remove with aqueous wash systems. Accordingly it is particularly useful to treat hard surfaces to improve their resistance to oily or greasy soils and/or limescale soils. A further benefit from improving the soil resistance of hard surfaces is that it may reduce the tendency to form water tide marks and the tendency to leave streaks especially after rinsing.

The improvement in the soil resistance of substrates, especially hard surfaces, is important in that it reduces the tendency of soil material to adhere to the surfaces, in effect slowing the rate, or reducing the extent, of soiling and/or makes it easier to remove the soil when cleaning the surface, particularly by reducing the mechanical effort required to remove the soil.

In the context of this invention soil resistance also applies to textile surfaces, particularly to upholstered surfaces and carpets. The improvement in the soil resistance and particularly oily soil resistance allows oily soils to be readily removed from textile surfaces by traditional shampoo methods for these surfaces.

Treatments that provide corrosion resistance to surfaces, especially ferrous metal surfaces are useful in numerous applications. Non-limiting examples include inclusion in hypochlorite containing cleaning solutions, use in marine maintenance cleaners and protectants, temporary rust inhibiting compositions for storing or transporting cleaned metal parts, preventing corrosion in process water such as boilers and cooling systems, and preventing corrosion in equipment used to apply salts and brines to deice road surfaces.

The provision of a treatment that provides a hydrophilic property to surfaces is useful in many applications. In the cleaning and rinsing of for example, ceramic, glass, plastic, and metal surfaces a hydrophilic surface will cause the water to drain in a thin sheet with no water breaks, and reduce the formation of water spots and streaking when the surfaces are dried.

Amic acids, particularly those prepared from maleic anhydride copolymers and more specifically from styrene maleic anhydride copolymers are known. U.S. Pat. No. 6,232,405, to Schmidhauser, et al, discloses amic acids that are reaction products of styrene maleic anhydride copolymers and low molecular weight primary or secondary amines, that are useful as pigment dispersants for inks. Preferred amines possess 4 carbon atoms or less. Dimethylaminopropylamine, which contains 5 carbon atoms, is mentioned. The amic acids that are disclosed to be useful as pigment dispersants are derived from methyl amine and ethyl amine.

Other reaction products of maleic anhydride copolymers with compounds containing both primary and tertiary amine functionality are known. U.S. Pat. No. 4,065,608 to Beck, et al, discloses a process of preparing a cationic paper sizing agent that is a copolymer of maleic anhydride and an alpha olefin containing 10 to 26 carbon atoms, reacted with mono primary/mono tertiary alkylene diamines and then further reacted with a low molecular weight polyamine. The process is carried out in an organic solvent and water is removed; the product is therefore an imide and not an amic acid.

U.S. Pat. No. 3,432,479 to Verdol, et al, discloses reaction products of a copolymer of a vinyl compound and maleic anhydride with monoamine and a polyamine, which can be a mono primary/mono tertiary amine. Again the reaction is carried out under conditions that produce the imide rather than the amic acid. Verdol's compositions are oil soluble and useful as detergents in lubricating oils.

U.S. Pat. No. 5,391,636 to Schilling discloses corrosion inhibiting compositions for metals in highly acidic environments which are polyimidoamines produced by the reaction of mixtures of styrene maleic anhydride copolymers and rosin or rosin derivatives, or fatty acids, or fatty acid derivatives, with one or more polyamines. The reactions are carried out under conditions that produce the imides.

U.S. Pat. No. 5,759,485 to Fischer, et al, discloses imidazoline and amidoamine salts of $C_{22}$ tricarboxylic acids useful as corrosion inhibitors. The tricarboxylic acids are formed by reaction of $C_{18}$ unsaturated fatty acids with maleic anhydride or fumaric acid or mixtures thereof. The resulting Diels-Alder adducts are first hydrolyzed with water to carboxylic acids before neutralizing with the amines and thus are salts and not amic acids.

There are many polymeric, film forming, hydrophilic compositions disclosed that are claimed to be useful as soil release treatments for hard surfaces and textiles. U.S. Pat. No. 8,709,168 to Waite, et al, discloses quaternized polyethylenimine polypropoxylate polyethyoxylate polymers. Because they are cationic they are not compatible with anionic surfactants, which are very commonly used in cleaning formulations.

U.S. Pat. No. 6,569,261 to Aubay, et al, discloses polymers that confer hydrophilic properties and corrosion resistance to glass and ceramic materials. The polymers are copolymers of "diquat", (a methacrylamido propyl monomer that contains 2 quaternary ammonium moieties), monomers with anionic functionality, and optionally hydrophilic monomers with neutral charge, in molar ratios of cations to anions preferably between 60 to 40 and 20 to 80.

U.S. Pat. Nos. 6,767,410 and 6,593,288 to Aubey, et al, disclose polymers that confer long lasting hydrophilic properties to hard surfaces. The polymers are copolymers of preferably diallyldimethylammonium chloride, monomers with anionic functionality, and optionally hydrophilic monomer with neutral charge, in molar ratios of cations to anions preferably between 50:50 and 10:90.

U.S. Pat. No. 6,703,358 to Aubey, et al, discloses cleaners for hard surfaces that contain at least one surfactant and a copolymer of preferably methacrylamidopropyltrimethylammonium chloride, monomers with anionionic functionality, and optionally hydrophilic monomer with neutral charge, in molar ratios of cations to anions preferably between 25:75 and 70:30.

U.S. Pat. No. 7,902,141 to Becker, et al discloses a hard surface treatment comprising a compound that is the reaction product of a polyamine, a crosslinking agent, and a component that contributes carboxylic acid, amide, nitrile, or ester functionality. The compositions are useful for example as hard surface treatments to prevent the formation of water spots and the adhesion of lime soap soil.

U.S. Pat. No. 7,741,265 to Iverson, et al, discloses a cleaning composition for hard surfaces that provides a hydrophilic barrier coating. The compositions comprise a nonionic surfactant, an acid, and a polymer with an acidic monomer capable of forming an anionic charge and a monomer having a permanent cationic charge or capable of forming a cationic charge upon protonation. The compositions have a pH value between 2 and 3.5 and do not contain surfactants with ionized moieties.

U.S. Pat. No. 8,410,038 to Davister, et al, discloses a cleaning composition containing an organic acid and a nonionic surfactant, and a hydrophilic polymer that absorbs to hard surfaces. Many polymers are described broadly including cationic polymers, amphoteric polymers, anionic polymers and betaines. The claims include only betaines and the structure is not further described.

U.S. Pat. No. 8,641,827 to Blattner, et al, discloses hard surface cleaners comprised of alkyl polyglucosides, glycerine, and cationic surface modification polymers described as polyampholytes with an acidic monomer capable of forming an anionic charge and a monomer having a permanent cationic charge or capable of forming a cationic charge upon protonation, and discloses that suitable polymers are described in U.S. Pat. Nos. 7,741,265, 6,569,261, 6,593,288, 6,703,358, and 6,767,410, described above.

SUMMARY OF THE INVENTION

This invention is to compositions and for modifying surfaces by contacting said surface with at least one amic acid, said amic acids being the reaction products of a monomeric or polymeric compound containing at least one carboxylic anhydride with at least one amine that comprises at least one primary or secondary amine and at least one tertiary amine. The invention is also to the surfaces thus modified. The compositions may provide soil release and corrosion resistance.

DESCRIPTION OF THE PREFERRED EMBODIMENTS

Amic acids are generally defined as any organic compound that comprise both one or more carboxylic acid or carboxylate functional groups, and one or more amide functional groups. The amic acids of this invention in addition comprise one or more tertiary amine functional groups. The amic acids of this invention are the reaction products of a monomeric or polymeric compound containing at least one carboxylic acid anhydride in which the carboxyl functionalities forming the anhydride are on adjacent carbon atoms, with at least one amine that comprises at least one primary or secondary amine and at least one tertiary amine.

Amic acids useful in this invention include:

I. polymeric amic acids with the structures:

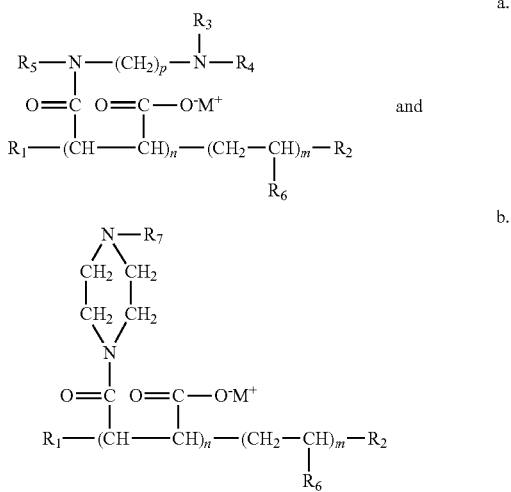

wherein $R_1$ and $R_2$ are H or a residue of the polymerization initiator, $R_3$ and $R_4$ are $C_{1-4}$ alkyl, hydroxy $C_{1-4}$ alkyl, or taken together are morpholinium, and can be the same or different, $R_5$ is H or $C_{1-4}$ alkyl or hydroxy alkyl, or $-(CH_2)_p NR_3 R_4$, $R_6$ is H; phenyl; methyl, ethyl or halogen substituted phenyl; $C_{1-8}$ branched or straight chain alkyl; or $OCH_3$; $R_7$ is methyl, ethyl, or hydroxy ethyl, M is H or an alkali metal cation, n+m is from about 20 to about 1000, and the ratio of n to m is from about 0.3 to 1 to about 1.1 to 1, and p is 2 or 3; and II. monomeric amic acids with the structures:

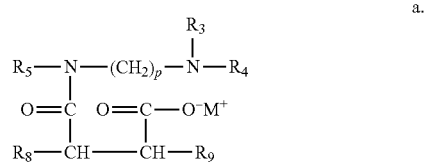

wherein $R_8$ is $C_1$ to $C_{18}$ branched or straight chain alkyl or alkenyl and $R_9$ is H or $R_8$ and the total number of carbon atoms in $R_8$ and $R_9$ is from about 10 to about 20, or wherein $R_8$ and $R_9$ form the structure

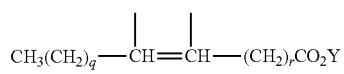

wherein q+r is equal to about 14 and Y is H, a substituted ammonium cation preferably derived from the amine that forms the amic acid, or an alkali metal cation, and

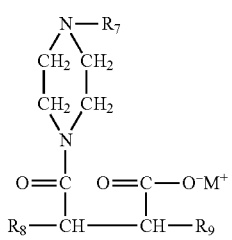

wherein $R_8$ is $C_1$ to $C_{18}$ branched or straight chain alkyl or alkenyl and $R_9$ is H or $R_8$ and the total number of carbon atoms in $R_8$ and $R_9$ is from about 10 to about 20, or wherein $R_8$ and $R_9$ form the structure

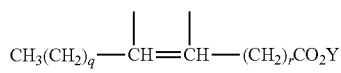

wherein q+r is equal to about 14 and Y is H, a substituted ammonium cation preferably derived from the amine that forms the amic acid, or an alkali metal ion.

The amic acids of this invention are distinguished from the soil repellent compositions of the prior art, such as those in U.S. Pat. Nos. 6,569,261, 6,703,358, 6,703,358, 7,902,141, 7,741,265, 8,410,038, and 8,641,827 described above, which may contain both carboxyl and amide functionality. However the functionalities are on different monomer units in the copolymers and are not on adjacent carbon atoms of the same monomer unit in the copolymer, as required in the present invention. Without being bound by theory it is believed that the presence of the amide and the carboxylic acid functionality on adjacent carbons together with the proximate tertiary amine function provides tenacious adhesion to substrate surfaces and also provides a hydrophilic film that is uniquely effective at preventing soil adhesion and providing corrosion protection. Without being bound by theory is it also believed that the deposition of the film from an aqueous solution provides a very thin film that may be a monolayer.

It will be apparent to those skilled in the art that the described amic acids are amphoteric. At acidic pH values the carboxylic acid will be undissociated and the tertiary amine functionality will be a protonated cation. At basic pH values the carboxylic acid will exist in the form of the carboxylate anion and the tertiary amine will be uncharged. At pH values near neutral, for example from about pH 6 to about pH 9, both the carboxylate and the tertiary amine will be charged.

Suitable polymeric anhydrides include copolymers of maleic anhydride with vinyl monomers. Non-limiting examples of vinyl monomers include styrene and methyl, ethyl or halogen substituted styrenes, alpha olefins containing from 2 to about 18 carbon atoms which may be straight chain or branched, alkyl vinyl ethers, vinyl pyrrolidone, vinyl caprolactam, ethyl acetate, and acrylic and methacrylic acids and ester and amide derivatives of acrylic and methacrylic acids. Preferred comonomers are styrene and methyl or ethyl substituted styrene, and alpha olefins containing from 2 to about 10 carbon atoms. Styrene is most preferred. The maleic anhydride copolymers can comprise from about 20 to about 1000 monomer units, and have molecular weights from about 1000 to about 100,000. Preferred copolymers comprise from about 20 to about 100 monomer units, and have molecular weights from about 1000 to about 10,000. A highly preferred copolymer is a 1:1 copolymer of maleic anhydride and styrene, with a molecular weight of about 5000.

Suitable monomeric anhydrides include reaction products of maleic anhydride with rosin acids and unsaturated fatty acids containing from about 12 to about 20 carbon atoms. Also included are reaction products of maleic anhydride with olefins containing about 10 to about 20 carbon atoms. The unsaturation of the olefins may be in the alpha position or may be internal in the chain. A preferred monomeric anhydride is maleated tall oil fatty acid, which is the reaction product of maleic anhydride and tall oil fatty acid.

Suitable amines include those which possess a primary or secondary amine moiety and one or more tertiary amine moieties. Examples of suitable amines include dimethylaminopropylamine, diethylaminopropylamine, dimethylaminoethylamine, diethylaminoethylamine, N-aminoethyl morpholine, N-aminopropylmorpholine, bis-2-hydroxyethylaminopropylamine, bis-2-hydroxyethylaminoethylamine, N-methyl piperazine, N-ethyl piperazine, N-hydroxyethyl piperazine, and N,N,N', N'tetramethyldipropylenetriamine. Amines wherein the primary or secondary amine is separated from the tertiary amine by at least 3 carbon atoms are preferred. Dimethylaminopropylamine is highly suitable.

A highly preferred monomeric amic acid is the reaction product of maleated tall oil fatty acid and dimethylaminepropylamine. A suitable maleated tall oil fatty acid is Tenax 2010 available from MeadWestvaco, Charleston, S.C.

A preferred polymeric amic acid is the reaction product of styrene maleic anhydride copolymer and dimethylaminopropylamine. In a highly preferred composition, the styrene maleic anhydride copolymer has a molecular weight of about 5000 and a ratio of styrene to maleic anhydride monomers of about 1 to 1. This copolymers is available as SMA 1000A or P, from Cray Valley, Exton, Pa. and as Xiran SP40005, from Polyscope, Geleen, Netherlands.

The amic acids of the invention are typically applied to surfaces from aqueous solutions. For example, they can be applied to surfaces as a final rinse at the conclusion of a cleaning process, or they can be included in the detergent composition used in the cleaning process. They are typically used at concentrations from about 0.1 percent by weight to about 10 percent by weight of the applied solution, and preferably from about 0.5 percent to about 5 percent by weight of the solutions.

The cleaning and other surface treatment solutions typically contain nonionic, anionic, or amphoteric surfactants or mixtures of surfactants. They may also contain alkaline materials such as sodium or potassium hydroxide, and sodium or potassium silicates. They may contain builders such as soda ash, phosphate salts, citrate salts and mixtures thereof. They may contain chelating agents such as EDTA, GLDA, and bis(carboxymethyl)glycine. They may contain solvents such as glycol ethers, alkylene glycols, alkyl alcohols, d'limonene, ester solvents such as butyl-3-hydroxy butyrate, acetic acid esters, and lactate esters, and mixtures thereof. They may contain organic acids such as acetic acid and glycolic acids or mineral acids such as phosphoric acid, hydrohalic acids, sulfuric acid and sulfamic acid. The amic acids of this invention are effective when applied from a broad range of aqueous cleaning and treatment solutions, and because of the amphoteric nature of the amic acids, are soluble and effective at pH values from about 1 to about 13. The invention is not limited by the composition of the detergent or other formulations that may comprise the amic acids of this invention.

The amic acids of this invention can be applied to any surface that is typically contacted with preferably water based cleaners or other water based treatments. The surfaces can include metal surfaces such stainless steel and aluminum, ceramic and porcelain surfaces, glass, stone, plastics such as thermoplastic and thermoset resins, composite surfaces such as Formica, fiberglass, and vinyl floor tile, painted surfaces, textile surfaces such as upholstery and carpet materials, and wood surfaces. The invention is not limited by the compositions of the treated surfaces.

The amic acids of this invention are prepared by reaction of the described monomeric or polymeric anhydrides with the described amines preferably in aqueous solutions. The reactions can be carried out by first adding the amine to water and then adding the anhydride with stirring. It can also be carried out by first dispersing the anhydride reactant in the water and then adding the amine. An alkali metal hydroxide, typically sodium hydroxide or potassium hydroxide may be added to maintain an alkaline pH and facilitate the reaction to the amic acid. Typically the reaction is carried out at temperatures between about 50° C. and 100° C., a highly suitable temperature range is about 70° C. and 90° C. The reaction is held at elevated temperatures for about 1 to about 5 hours, typically between from about 2 to about 3 hours. The invention is not limited by the method or conditions of producing the amic acids.

The following examples further illustrate the invention. As used herein all parts or percentages are by weight of the entire composition unless otherwise indicated.

EXAMPLE 1

An amic acid was prepared by adding 43 g of maleated tall oil fatty acid, (Tenax 2010 from MeadWestvaco Corporation, U.S.A., Charleston, S.C.), to 17 g of dimethylaminopropylamine (DMAPA) dissolved in 56 g of water. This is approximately a molar ratio between the maleated tall oil fatty acid and the amine that allows for the reaction of the anhydride with the primary amine to form an amide and a carboxylic acid on adjacent carbons, thus forming an amic acid of this invention, and the neutralization of all of the acid functionality of the maleated tall oil with the excess unreacted tertiary and primary amine functionality of the DMAPA. The mixture was heated to 80° C. and mixed for 3 hours to allow the reaction to complete. The product was a viscous amber solution and was 51 percent active amic acid.

EXAMPLE 2

A polymeric amic acid was prepared by slowly adding 145 g of a 1:1 copolymer of styrene and maleic anhydride (SMA 1000P from Cray Valley, U.S.A., Exton, Pa.), to 64 g of DMAPA in 293 g of water at 80° C., such that there is a 1:1 molar ratio between the anhydride groups of the copolymer and the primary amine reactant. The mixture was held at 80° C. and mixed for 3 hours to allow the primary amine groups on the DMAPA reactant to chemically react with the anhydride moieties of the polymer and form an amide group and a carboxylic acid on adjacent carbons on the polymer backbone, thus forming an amic acid of this invention. The product is a viscous light yellow solution that is 41 percent active amic acid.

To determine the extent of the reaction, 10 g of the product was mixed with 15 mL of water and adjusted to a pH of 11 using 10 percent sodium hydroxide. This solution was titrated with 1 N hydrochloric acid to a pH of under 2, recording the pH and titrant volumes as the increments of acid were added. The volumes of titrant at the inflections at pH 7 and pH 2 indicate that the reaction forms the amic acid in approximated 100 percent yield.

EXAMPLE 3

A polymeric amic acid solution was prepared by slowly adding 44 g of the 1:1 copolymer of isobutylene and maleic anhydride (Isobam 600 from Kuraray Company, Japan) to 30 g of DMAPA in 51 g of water, such that there is a 1:1 mole ratio between the anhydride monomer units of the copolymer and the amine. The mixture was heated to about 80° C. and mixed for 4 hours to allow the reaction of the primary amine and the anhydride to form the amic acid. Additional water was added as the reaction progressed. The product is a viscous light yellow solution, containing 59 percent active amic acid.

EXAMPLE 4

An amic acid solution was prepared by adding 95 g of C-16-18 alkenyl succinic anhydride (ASA from Albemarle Corporation, Baton Rouge, La.) with 29 g of DMAPA dissolved in 52 g of water, such that there is a 1:1 molar ratio between the alkenyl succinic anhydride and the amine. The mixture was heated to about 80° C. and mixed for 1 hour to allow the reaction of the primary amine and the anhydride to form the amic acid. Additional water was added during the reaction to control the viscosity. The product is an amber viscous liquid containing 51 percent active amic acid.

EXAMPLE 5

A polymeric amic acid solution was prepared by slowly adding 36 g of the 1:1 copolymer of ethylene and maleic anhydride (ZeMac E60 from Vertellus Specialties Inc., U.S.A, Indianapolis, Ind.), to 32 g of DMAPA in 53 g of water, such that there is a 1:1 molar ratio between the anhydride functionality of the copolymer and the amine. The mixture was heated to about 80° C. and mixed for 3 hours to allow the reaction of the primary amine and the anhydride to form the amic acid. Additional water was added during the reaction to control the viscosity. The product is a viscous yellow solution containing about 46 percent active amic acid.

EXAMPLE 6

A polymeric amic acid was prepared by slowly adding 45.4 g of a 1:1 copolymer of styrene and maleic anhydride (SMA 1000P from Cray Valley, U.S.A., Exton, Pa.), to 28 g of N-aminopropyl morpholine in 112 g of water at 80° C., such that there is a 1:1 mole ratio between the anhydride groups of the copolymer and the primary amine. The mixture was held at 80° C. and mixed for 5 hours to allow the reaction of the primary amine and the anhydride to form the amic acid. Water was added as necessary to reduce the viscosity. The product is a viscous light yellow solution containing 39 percent by weight active amic acid.

EXAMPLE 7

A polymeric amic acid was prepared by slowly adding 26 g of a 1:1 copolymer of styrene and maleic anhydride (SMA 1000P from Cray Valley, U.S.A., Exton, Pa.), to 13 g of diethylaminoethyl amine in 61 g of water at 80° C., such that there is a 1:1 mole ratio between the anhydride groups of the copolymer and the primary amine. The mixture was held at 80° C. and mixed for 3 hours to allow the reaction of the primary amine and the anhydride to form the amic acid. The amic acid precipitated from the solution as an amorphous resin, that could be solubilized by reducing the pH to about 5.

EXAMPLE 8

A polymeric amic acid was prepared by slowly adding 26 g of a 1:1 copolymer of styrene and maleic anhydride (SMA 1000P from Cray Valley, U.S.A., Exton, Pa.), to 14.6 g of N-aminopropyl diethylamine in 60 g of water at 65° C., such that there is a 1:1 mole ratio between the anhydride groups of the copolymer and the primary amine. The mixture was held at 70° C. and mixed for 5 hours to allow the reaction of the primary amine and the anhydride to form the amic acid. Water was added as necessary to reduce the viscosity. The product is a viscous light yellow solution containing 36 percent active amic acid by weight.

EXAMPLE 9

A polymeric amic acid was prepared by slowly adding 63.6 g of a 2:1 copolymer of styrene and maleic anhydride (SMA 2000A from Cray Valley, U.S.A., Exton, Pa.), to 20.4 g of DMAPA in 30 g of water at 80° C., such that there is a 1:1 mole ratio between the anhydride groups of the copolymer and the primary amine. The mixture was held at 80° C. and mixed for 3 hours to allow the reaction of the primary amine and the anhydride to form the amic acid. Additional water was added to reduce the viscosity. The product was extremely viscous, and contained 32 percent active amic acid.

EXAMPLE 10

A polymeric amic acid was prepared by mixing 24.8 g of bis-2-hydroxyethylaminopropylamine and 140 g of water and slowly adding 35.2 g of SMA 1000A while heating to 85° C., such that there is a 1:1 mole ratio between the anhydride groups of the copolymer and the primary amine. The mixture was held at 85° C. for 4 hours at which time the reaction of the primary amine and the anhydride forming the amic acid was complete. An additional 40 g of water was added during the reaction. The product was a clear viscous orange solution.

EXAMPLE 11

A polymeric amic acid was prepared by adding 116.9 g of a 1:1 copolymer of styrene and maleic anhydride (Xiran SP40005 from Polyscope, Geleen, Netherlands) over half an hour, to 51.1 g of DMAPA in 312 g of water at 70° C., such that there is a 1:1 mole ratio between the anhydride groups of the copolymer and the primary amine. The mixture was held at 75° C. and mixed for 3 hours to allow the reaction of the primary amine and the anhydride to form the amic acid. 19.9 grams of 50 percent NaOH were added as the reaction progressed, to maintain the pH at between 10 and 11. The product is a viscous amber solution containing 32 percent active amic acid.

COMPARATIVE EXAMPLE 12

An amic acid prepared from diethanolamine which does not contain tertiary amine functionality was prepared by adding 105 g of diethanolamine to 333 g of water, heating the mixture to 80° C. and adding 117 g of SMA 1000P, and reacting at 80-90° C. for 3 hours until the reaction was complete. 2 molar equivalents of the amine were added for each molar equivalent of anhydride in the SMA producing the amine salt of the amic acid.

EXAMPLE 13

Soil Release:

The amic acids solutions described in the preceding examples were diluted to a concentration of 2 percent amic acid by weight in the solutions described in Table 1. 1.5"×1" stainless steel coupons cleaned to no water break were dipped in these solutions for 5 seconds then dipped in distilled water for 5 seconds to rinse, after which they were allowed to drain and dry at an angle. After drying, the coupons were positioned on a horizontal surface and 100 µL of melted Crisco vegetable shortening was pipetted to the center of each coupon and allowed to cool to ambient temperature. After cooling, the coupons with the Crisco soil were carefully immersed horizontally in 50 mL of a detergent solution containing 0.1 percent of an anionic surfactant and 0.1 percent NaOH. Over time the Crisco droplets separated from the stainless steel surface and were observed to float in the detergent solution. The time necessary to remove each Crisco droplet from the surface was noted. The tests were performed in triplicate and the times were averaged. The results are shown in Table 1. The results show that the compositions of the invention, and especially the composition of Example 2, which is a high preferred polymeric amic acid of this invention, decreased the adhesion of the Crisco soil and allowed it to readily separate from the surface. The Competitive Product A was a commercially available soil repellent polymer.

TABLE 1

| Soil Repellent | Solution Composition | Time for Crisco Drop to Separate, minutes |
| --- | --- | --- |
| None | DI Water, pH 9 | >300 |
| Example 1 | DI Water, pH 9 | 7 |
| Example 2 | DI Water, pH 9 | 8 |
| Example 3 | DI Water, pH 9 | 24 |
| Example 4 | DI Water, pH 9 | 8 |
| Example 5 | DI Water, pH 9 | 150 |
| Example 6 | DI Water, pH 9 | 15 |
| Example 7 | DI Water, pH 9 | 29 |
| Example 8 | DI Water, pH 9 | 18 |
| Competitive Product A | DI Water, pH 9 | 15 |
| None | DI water adjusted to pH 4 with HCl | >300 |
| Example 1 | DI water adjusted to pH 4 with HCl | 152 |
| Example 2 | DI water adjusted to pH 4 with HCl | 8 |
| Competitive Product A | DI water adjusted to pH 4 with HCl | 16 |
| None | DI water at pH 7 | >300 |
| Example 1 | DI water at pH 7 | 48 |
| Example 2 | DI water at pH 7 | 7 |
| Competitive Product A | DI water at pH 7 | 20 |
| None | DI water adjusted to pH 10 with NaOH | >300 |
| Example 1 | DI water adjusted to pH 10 with NaOH | 153 |
| Example 2 | DI water adjusted to pH 10 with NaOH | 8 |
| Competitive Product A | DI water adjusted to pH 10 with NaOH | 35 |
| None | 5% NaOH | >300 |
| Example 1 | 5% NaOH | >300 |
| Example 2 | 5% NaOH | 206 |

TABLE 1-continued

| Soil Repellent | Solution Composition | Time for Crisco Drop to Separate, minutes |
|---|---|---|
| Competitive Product A | 5% NaOH | 59 |
| None | 5% EDTA | 240 |
| Example 1 | 5% EDTA | 29 |
| Example 2 | 5% EDTA | 11 |
| Competitive Product A | 5% EDTA | 166 |
| None | 5% NaLAS | >300 |
| Example 1 | 5% NaLAS | 71 |
| Example 2 | 5% NaLAS | 6 |
| Competitive Product A | 5% NaLAS | 76 |
| None | 5% Nonionic surfactant HLB 12.5 | >300 |
| Example 1 | 5% Nonionic surfactant HLB 12.5 | 3 |
| Example 2 | 5% Nonionic surfactant HLB 12.5 | 240 |
| Competitive Product A | 5% Nonionic surfactant HLB 12.5 | 5 |

EXAMPLE 14

A non-streaking soil repellent cleaner was formulated with 1 percent Surtech CR-125 surfactant (available from SCF, Inc.), 1 percent butyl-3-hydroxy butyrate (Omnia solvent, available from Eastman Chemical Co.) and 2 percent (as is) of the composition of Example 2. It was used to clean counters and displays in a retail store, and provided surfaces from which fingerprints and other soils could be removed easily by dry wiping leaving a non-streaking surface.

EXAMPLE 15

To evaluate efficacy of the compositions of the invention as substantive rinse aids for thermoplastic polyolefin (TPO), the compositions of Examples 2 (SMA-DMAPA) and Example 10 (SMA-aminopropyl bis 2 hydroxy ethyl amine, and comparative Example 12 (SMA-DEA) were tested by the following procedure.

TPO panels were cleaned thoroughly and rinsed with distilled water. 0.05% active solutions of the test materials were prepared in distilled water. The panels were immersed in the test solutions for 30 seconds and removed and the surface was evaluated immediately for breaks in the water surface, by noting the percent of the immersed surface that retained a water film. The panel was then rinsed in a stream of distilled water for 30 seconds, and the evaluation was repeated. The results are shown in Table 2. The results show that the compositions of the invention are effective rinse aids that leave a hydrophilic surface on TPO.

TABLE 2

| Example # | % water film immediately | % water film after 30 second rinse |
|---|---|---|
| Comparative Example 12 | 0 | 0 |
| Example 2 | 95 | 95 |
| Example 10 | 100 | 95 |

EXAMPLE 16

Corrosion Resistance:

The amic acid solutions prepared in Examples 1-5, 9 and comparative Example 12 were diluted to the concentrations of active amic acids indicated in the Table 3 with distilled water, and 10 ml of the solutions were added to test tubes. Cast iron chips were exposed to the polymer solutions for 5 minutes, the solutions were drained from the chips. The chips were spread on a 70 mm Whatman #4 filter paper and allowed to dry under ambient conditions. An additional set of tests were prepared as above, but after draining the amic acid solutions, the iron chips were rinsed with an equal volume of distilled water, the water was decanted and the chips were spread on filter paper and allowed to dry as above. After they had stood overnight the chips were removed from the filter paper, and the filter papers were evaluated for corrosion by estimating the rust staining of the filter papers due to corrosion of the chips. The inhibition was rated from 0 to 5, where 0 is no visible rust stains (complete corrosion inhibition) and 5 is 50 percent or more rust stain coverage of the filter paper (no corrosion inhibition). The results are shown in Table 3. The results indicate that the composition of Example 1, which is a highly preferred monomeric amic acid of this invention, is a highly effective ferrous corrosion inhibitor.

TABLE 3

| Amic Acid | Concentration | Inhibition before rinsing | Inhibition after rinsing |
|---|---|---|---|
| Example 1 | 5% | 0 | 0 |
| " | 2% | 0 | 0 |
| " | 1% | 0 | 2 |
| Example 2 | 5% | 2 | 3 |
| Example 3 | 5% | 2 | 3 |
| Example 4 | 5% | 3 | 3 |
| Example 5 | 5% | 2 | 3 |
| Example 9 | 5% | 1 | 4 |
| Comparative Example 12 | 5% | 4 | 5 |
| None | | 5 | 5 |

EXAMPLE 17

The composition of Example 2 was added to an all-purpose foam cleaner suitable for vinyl, carpet, fabric and plastic surfaces, at a level of 2 percent as is. The cleaner was applied by spray to a cotton duck fabric to saturation, and allowed to dry. As a control the cleaner without the amic acid was also applied in the same manner to the fabric. After drying overnight, a soil consisting of 0.1 percent carbon black dispersed in soybean oil was applied in a uniform pattern to 3"×3" swatches of the treated fabrics. After standing one hour the swatches were laundered in a laboratory Tergotometer for 10 minutes at 25° C. After drying the laundered swatches a visual evaluation showed significantly improved soil removal from the fabric treated with the cleaner containing the amic acid of Example 2.

EXAMPLE 18

The composition of Example 2 was diluted to 2 percent by weight active solutions and applied to ceramic tiles by wiping. Tiles treated with Competitive commercial polymers A, B and C at 2 percent active polymer by weight, and an untreated tile were included in the testing. The tiles were allowed to dry and 100 microliter droplets of melted Spangler Sebum Soil containing 1 percent carbon black were applied to the treated ceramic surface in triplicate. After cooling, the tiles were submerged in water containing 0.1 percent anionic surfactant and 0.1 percent NaOH. The time required for the sebum droplets to separate from the ceramic surfaces was noted and averaged for each treatment. The results are shown in the Table 4. The results show that the composition of Example 2, a highly preferred polymeric amic acid of this invention, effectively decreased the adhesion of sebum soil to ceramic tile.

TABLE 4

| Soil Repellent Treatment | Average time for sebum soil removal, minutes |
|---|---|
| Example 2 | 8 |
| Competitive polymer A | 66 |
| Competitive polymer B | 15 |
| Competitive polymer C | 51 |
| No treatment | 189 |

The invention can be embodied in other forms without departing from the spirit or essential attributes thereof. Reference should therefore be had to the following claims, rather than to the foregoing specification to determine the scope of the invention.

The invention claimed is:

1. A composition for modifying surfaces at least one amic acid, said amic acid being the reaction product of a monomeric compound containing at least one carboxylic acid anhydride with at least one amine that comprises at least 1 primary or secondary amine and at least one tertiary amine, said amic acids chosen from the group consisting of monomeric amic acid with the structures:

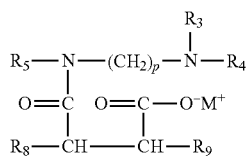

a.

wherein $R_8$ is $C_{10}$ to $C_{20}$ alkyl or alkenyl and $R_9$ is H, or wherein $R_8$ and $R_9$ form the structure

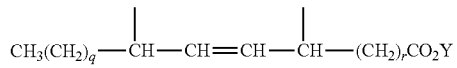

wherein q+r is equal to about 12 and y is H, a substituted ammonium cation, or an alkali metal cation; and

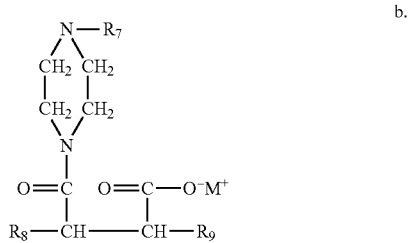

b.

wherein $R_8$ is $C_{10}$ to $C_{20}$ alkyl or alkenyl and $R_9$ is H, or wherein $R_8$ and $R_9$ form the structure

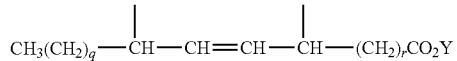

wherein q+r is equal to about 12 and y is H, a substituted ammonium cation, or an alkali metal cation.

2. The composition for modifying surfaces according to claim 1, wherein the amic acid is the reaction product of a meleated tall oil fatty acid and an amine comprising a primary and a tertiary amine.

3. The composition for modifying surfaces according to claim 1, wherein the amic acid is the reaction product of a maleated tall oil fatty acid and dimethylaminopropylamine.

* * * * *